United States Patent
Usui et al.

(10) Patent No.: US 11,241,869 B2
(45) Date of Patent: Feb. 8, 2022

(54) ETHYLENE-VINYL ALCOHOL COPOLYMER COMPOSITION, MELT-FORMING MATERIAL, MULTILAYER STRUCTURE, AND MULTILAYER PIPE

(71) Applicant: Mitsubishi Chemical Corporation, Tokyo (JP)

(72) Inventors: Shintaro Usui, Tokyo (JP); Minako Ikeshita, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/872,944

(22) Filed: May 12, 2020

(65) Prior Publication Data

US 2020/0269558 A1 Aug. 27, 2020

Related U.S. Application Data

(63) Continuation of application No. PCT/JP2018/043119, filed on Nov. 22, 2018.

(30) Foreign Application Priority Data

Nov. 22, 2017 (JP) .............................. JP2017-224273

(51) Int. Cl.
| | | |
|---|---|---|
| *B32B 27/30* | (2006.01) | |
| *B32B 1/08* | (2006.01) | |
| *B32B 27/18* | (2006.01) | |
| *C08K 5/101* | (2006.01) | |
| *C08K 5/13* | (2006.01) | |
| *C08K 5/3435* | (2006.01) | |
| *F16L 9/14* | (2006.01) | |

(52) U.S. Cl.
CPC .............. *B32B 27/306* (2013.01); *B32B 1/08* (2013.01); *B32B 27/18* (2013.01); *C08K 5/101* (2013.01); *C08K 5/13* (2013.01); *C08K 5/3435* (2013.01); *F16L 9/14* (2013.01); *B32B 2597/00* (2013.01)

(58) Field of Classification Search
CPC ......... B32B 27/306; B32B 1/08; B32B 27/18; B32B 2597/00; C08K 5/101; C08K 5/13; C08K 5/3435; F16L 9/14
See application file for complete search history.

(56) References Cited

U.S. PATENT DOCUMENTS

| | | | |
|---|---|---|---|
| 5,744,547 | A | 4/1998 | Moritani et al. |
| 9,290,636 | B2 * | 3/2016 | Kazeto .................... B29C 48/09 |
| 2013/0040087 | A1 | 2/2013 | Kazeto et al. |
| 2018/0319965 | A1 | 11/2018 | Seno et al. |
| 2019/0077945 | A1 | 3/2019 | Hashimoto et al. |

FOREIGN PATENT DOCUMENTS

| | | |
|---|---|---|
| EP | 2554590 | 2/2013 |
| EP | 2554592 | 2/2013 |
| EP | 3053960 | 8/2016 |
| JP | S63-286459 | 11/1988 |
| JP | H9-071620 | 3/1997 |
| JP | 2014-172928 | 9/2014 |
| WO | 2011/125736 | 10/2011 |
| WO | 2017/082063 | 5/2017 |
| WO | 2017/204272 | 11/2017 |

OTHER PUBLICATIONS

ISR issued in WIPO Patent Application No. PCT/JP2018/043119, dated Jan. 29, 2019, English translation.
IPRP issued in WIPO Patent Application No. PCT/JP2018/043119, dated May 26, 2020, English translation.
ISR issued in WIPO Patent Application No. PCT/JP2017/019451, dated Aug. 15, 2017, English translation.
IPRP issued in WIPO Patent Application No. PCT/JP2017/019451, dated Dec. 6, 2018, English translation.
EESR issued in EP Patent Application No. 18881907.2 dated Dec. 16, 2020.

* cited by examiner

*Primary Examiner* — Michael C Miggins
(74) *Attorney, Agent, or Firm* — Greenblum & Bernstein, P.L.C.

(57) ABSTRACT

An ethylene-vinyl alcohol copolymer composition contains: (A) an ethylene-vinyl alcohol copolymer; (B) an antioxidant; and (C) a sorbic acid ester; wherein the sorbic acid ester (C) is present in an amount of 0.00001 to 10 ppm based on the weight of the ethylene-vinyl alcohol copolymer composition; wherein the weight ratio (B)/(C) of the antioxidant (B) to the sorbic acid ester (C) is 500 to 1,000,000. The resulting ethylene-vinyl alcohol copolymer composition is less susceptible to coloration.

5 Claims, No Drawings

ETHYLENE-VINYL ALCOHOL COPOLYMER COMPOSITION, MELT-FORMING MATERIAL, MULTILAYER STRUCTURE, AND MULTILAYER PIPE

RELATED APPLICATION

This application is a continuation of International Application No. PCT/JP2018/043119, filed on Nov. 22, 2018, which claims priority to Japanese Patent Application No. 2017-224273, filed on Nov. 22, 2017, the entire contents of each of which being hereby incorporated by reference.

TECHNICAL FIELD

The present disclosure relates to an ethylene-vinyl alcohol copolymer composition (hereinafter referred to as "EVOH resin composition") containing an ethylene-vinyl alcohol copolymer (hereinafter referred to as "EVOH"), melt-forming material produced by using the EVOH resin composition, a multilayer structure, and a multilayer pipe. More specifically, the present disclosure relates to an EVOH resin composition less susceptible to coloration, a melt-forming material formed from the EVOH resin composition, and a multilayer structure and a multilayer pipe each including a layer formed from the EVOH resin composition.

BACKGROUND ART

The EVOH is excellent in transparency, gas barrier properties such as oxygen barrier property, aroma retaining property, solvent resistance, oil resistance, and mechanical strength, and is formed into films, sheets, bottles, and the like, which are widely used as various packaging materials such as food packaging materials, pharmaceutical product packaging materials, industrial chemical packaging materials, and agricultural chemical packaging materials. Further, the EVOH is used as a layer forming material for forming a layer of a multilayer pipe for hot water circulation in order to prevent corrosion of a floor heating system of hot water circulation type.

However, the EVOH contains relatively active hydroxyl groups in its molecule and, therefore, is liable to be thermally decomposed. Accordingly, the EVOH is susceptible to coloration, gelation, and other problems to be thereby deteriorated in melt stability, when being melt-formed. A known method to solve these problems is to add various heat stabilizers to the EVOH (see, for example, PTL 1).

Where a product formed from the EVOH is used for a prolonged period, on the other hand, the formed product is liable to suffer from odor emanation and cracking due to degradation of the EVOH in some use environment. The multilayer pipe for the hot water circulation, for example, is liable to be degraded by oxygen present in air when being exposed to a higher temperature for a prolonged period. A known art for suppressing the degradation is to use a specific amount of an antioxidant and a conjugated polyene compound in combination (see, for example, PTL 2).

Further, agricultural materials (silage films, multi-purpose films, and the like) containing the EVOH are used outdoor for a prolonged period to be thereby exposed to sunlight, geothermal heat, wind, rain, and the like. Therefore, the agricultural materials are also liable to be degraded by oxygen present in air. It is known that a silage film excellent in weatherability can be provided by blending a specific amount of a hindered amine compound with the EVOH for suppression of the degradation (see, for example, PTL 3).

RELATED ART DOCUMENTS

Patent Documents

PTL 1: JP-A-SHO63(1988)-286459
PTL 2: WO2011/125736
PTL 3: JP-A-2014-172928

SUMMARY

However, the arts disclosed in PTL 1 to PTL 3 require further improvement for suppression of the coloration of the EVOH during the melt forming. For this reason, there is a strong demand for an EVOH resin composition which is less susceptible to the coloration.

In view of the foregoing, the inventors conducted intensive studies and, as a result, found that, where an antioxidant and a specific very small amount of a sorbic acid ester are used in combination for an EVOH resin composition and the weight ratio between the antioxidant and the sorbic acid ester falls within a specific range, the aforementioned problems can be solved.

According to a first aspect of the present disclosure, there is provided an EVOH resin composition containing: (A) an EVOH; (B) an antioxidant; and (C) a sorbic acid ester; wherein the sorbic acid ester (C) is present in an amount of 0.00001 to 10 ppm based on the weight of the EVOH resin composition; wherein the weight ratio (B)/(C) of the antioxidant (B) to the sorbic acid ester (C) is 500 to 1,000,000. According to a second aspect of the present disclosure, a melt-forming material formed from the EVOH resin composition is provided. According to a third aspect of the present disclosure, a multilayer structure including a layer formed from the EVOH resin composition is provided. According to a fourth aspect of the present disclosure, a multilayer pipe formed from the multilayer structure is provided.

The EVOH resin composition of the present disclosure contains the EVOH (A), the antioxidant (B), and the sorbic acid ester (C). In the EVOH resin composition, the sorbic acid ester (C) is present in an amount of 0.00001 to 10 ppm based on the weight of the EVOH resin composition, and the weight ratio (B)/(C) of the antioxidant (B) to the sorbic acid ester (C) is 500 to 1,000,000. Therefore, the EVOH resin composition is highly effective in suppressing coloration due to heating during melt kneading and melt forming.

Where the antioxidant (B) is present in an amount of 1 to 30,000 ppm based on the weight of the EVOH resin composition, the coloration suppressing effect is more excellent.

The melt-forming material formed from the EVOH resin composition of the present disclosure is resistant to degradation, and is excellent in coloration suppressing effect. Therefore, the melt-forming material is formed into various products, which can be advantageously used as packaging materials, for example, for foods, chemical agents, agricultural chemicals, and the like, and particularly as multilayer pipe forming materials.

The multilayer structure including the layer formed from the EVOH resin composition of the present disclosure is resistant to degradation, and is excellent in coloration suppressing effect. Therefore, the multilayer structure is formed into various products, which can be advantageously used as packaging materials, for example, for foods, chemical agents, agricultural chemicals, and the like, and particularly for multilayer pipes.

DESCRIPTION OF EMBODIMENTS

Preferred embodiments of the present disclosure will hereinafter be described in detail. It should be understood that these preferred embodiments are illustrative but not limitative.

<EVOH Resin Composition>

An EVOH resin composition of the present disclosure contains: (A) an EVOH; (B) an antioxidant; and (C) a sorbic acid ester. The EVOH resin composition of the present disclosure contains the EVOH (A) as a major component. That is, the proportion of the EVOH (A) in the EVOH resin composition is typically not less than 70 wt. %, preferably not less than 80 wt. %, more preferably not less than 90 wt. %. The components of the EVOH resin composition of the present disclosure will hereinafter be described in turn.

[EVOH (A)]

The EVOH (A) to be used in the present disclosure is a water-insoluble thermoplastic resin which is typically prepared by copolymerizing ethylene and a vinyl ester monomer and then saponifying the resulting copolymer, and is generally referred to as ethylene-vinyl alcohol copolymer or saponified ethylene-vinyl ester copolymer. A known polymerization method such as solution polymerization method, suspension polymerization method or emulsion polymerization method may be utilized for the polymerization. In general, a solution polymerization method using methanol as a solvent is utilized. The saponification of the resulting ethylene-vinyl ester copolymer may be achieved by a known method.

The EVOH (A) to be used in the present disclosure mainly contains an ethylene structural unit and a vinyl alcohol structural unit, and generally further contains a small amount of a vinyl ester structural unit left unsaponified.

Vinyl acetate is typically used as the vinyl ester monomer, because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters preferably have a carbon number of 3 to 20, more preferably 4 to 10, particularly preferably 4 to 7. These vinyl esters are typically each used alone or, as required, a plurality of vinyl esters may be selected from these vinyl esters to be used in combination.

The ethylene structural unit content of the EVOH (A), which is measured in conformity with ISO14663, is typically 20 to 60 mol %, preferably 25 to 50 mol %, particularly preferably 25 to 45 mol %. If the ethylene structural unit content is excessively low, the high-humidity gas barrier property and the melt formability tend to be deteriorated. If the ethylene structural unit content is excessively high, on the other hand, the gas barrier property tends to be deteriorated.

The vinyl ester saponification degree of the EVOH (A), which is measured in conformity with JIS K6726 (with the use of a solution obtained by homogenously dissolving the EVOH in a water/methanol solvent), is typically 90 to 100 mol %, preferably 95 to 100 mol %, particularly preferably 99 to 100 mol %. If the saponification degree is excessively low, the gas barrier property, the heat stability, the humidity resistance, and the like tend to be deteriorated.

The EVOH (A) typically has a melt flow rate (MFR) of 0.5 to 100 g/10 minutes, preferably 1 to 50 g/10 minutes, particularly preferably 3 to 35 g/10 minutes (as measured at 210° C. with a load of 2160 g). If the MFR of the EVOH (A) is excessively high, the film formability tends to be deteriorated. If the MFR of the EVOH (A) is excessively low, the melt extrusion tends to be difficult.

The EVOH (A) to be used in the present disclosure may further contain a structural unit derived from any of the following exemplary comonomers in an amount that does not impair the effects of the present disclosure (e.g., typically in an amount of not greater than 20 mol %, preferably not greater than 10 mol %, of the EVOH (A)). The comonomers include: olefins such as propylene, 1-butene, and isobutene; hydroxyl-containing α-olefins such as 2-propen-1-ol, 3-buten-1-ol, 4-penten-1-ol, 5-hexen-1-ol, 3,4-dihydroxy-1-butene, and 5-hexene-1,2-diol, and derivatives including esterification products (acylation products) of these hydroxyl-containing α-olefins such as 3,4-diacyloxy-1-butene, 3,4-diacetoxy-1-butene, 2,3-diacetoxy-1-allyloxypropane, 2-acetoxy-1-allyloxy-3-hydroxypropane, 3-acetoxy-1-allyloxy-2-hydroxypropane, glycerin monovinyl ether, and glycerin monoisopropenyl ether; hydroxymethyl vinylidenes such as 1,3-hydroxy-2-methylenepropane and 1,5-hydroxy-3-methylenepentane, and esterification products of these hydroxymethyl vinylidenes (i.e., vinylidene diacetates) such as 1,3-diacetoxy-2-methylenepropane, 1,3-dipropionyloxy-2-methylenepropane, and 1,3-dibutyronyloxy-2-methylenepropane; unsaturated acids such as acrylic acid, methacrylic acid, crotonic acid, phthalic acid (anhydride), maleic acid (anhydride), and itaconic acid (anhydride), salts of these unsaturated acids, and monoalkyl and dialkyl esters of these unsaturated acids each including a C1 to C18 alkyl group; acrylamide compounds such as acrylamide, N-alkylacrylamides each including a C1 to C18 alkyl group, N,N-dimethylacrylamide, 2-acrylamidopropane sulfonic acid and its salts, and acrylamidopropyldimethylamine and its acid salts and quaternary salts; methacrylamide compounds such as methacrylamide, N-alkylmethacrylamides each including a C1 to C18 alkyl group, N,N-dimethylmethacrylamide, 2-methacrylamidopropane sulfonic acid and its salts, and methacrylamidopropyldimethylamine and its acid salts and quaternary salts; N-vinylamides such as N-vinylpyrrolidone, N-vinylformamide, and N-vinylacetamide; vinyl cyanates such as acrylonitrile and methacrylonitrile; vinyl ethers each including a C1 to C18 alkyl group such as alkyl vinyl ethers, hydroxyalkyl vinyl ethers, and alkoxyalkyl vinyl ethers; halogenated vinyl compounds such as vinyl chloride, vinylidene chloride, vinyl fluoride, vinylidene fluoride, and vinyl bromide; vinylsilanes such as trimethoxyvinylsilane; allyl acetate, and halogenated allyl compounds such as allyl chloride; allyl alcohol compounds such as allyl alcohol and dimethoxyallyl alcohol; and trimethyl(3-acrylamido-3-dimethylpropyl)ammonium chloride and acrylamido-2-methylpropane sulfonic acid. These may be used alone or in combination.

An EVOH containing a structural unit having a primary hydroxyl group in its side chain among structural units derived from the aforementioned comonomers is preferred because the secondary formability is improved in stretching process, vacuum pressure forming process, and the like. Particularly, an EVOH containing a structural unit having 1,2-diol in its side chain is preferred.

Where the EVOH (A) contains the structural unit having the primary hydroxyl group in its side chain, the primary hydroxyl group content is typically 0.1 to 20 mol %, preferably 0.1 to 15 mol %, particularly preferably 0.1 to 10 mol %.

The EVOH (A) may be a mixture of different EVOHs. These EVOHs may have different contents of the ethylene structural unit, different contents of the structural unit having the primary hydroxyl group in the side chain, different saponification degrees, and different melt flow rates (MFRs), and contain different comonomer components.

In the present disclosure, post-modified EVOHs such as urethanized EVOH, acetalized EVOH, cyanoethylated EVOH, and oxyalkylenated EVOH are also usable as the EVOH (A).

[Antioxidant (B)]

The antioxidant (B) may be a compound capable of trapping radicals occurring due to the deterioration of the EVOH (A), and various antioxidants for resins are usable as the antioxidant (B). Examples of the antioxidant (B) include hindered phenol antioxidant, phosphite antioxidant, thioether antioxidant, hindered amine antioxidant, benzotriazole antioxidant, and benzophenone antioxidant. Of these, the hindered phenol antioxidant and the hindered amine antioxidant are preferred in that they are particularly excellent in degradation preventing effect.

The hindered phenol antioxidant itself is excellent in heat stability, and is capable of trapping oxygen radicals which may otherwise cause oxidative degradation. The hindered phenol antioxidant is excellent in oxidative degradation preventing effect when being added as the antioxidant to the EVOH resin composition.

Specific examples of the hindered phenol antioxidant include pentaerythritol tetrakis[3-(3,5-di-tert-butyl-4-hydroxyphenyl) propionate] (IRGANOX 1010 available from BASF A.G., and having a melting point of 110° C. to 125° C. and a molecular weight of 1178), octadecyl-3-(3,5-di-tert-butyl-4-hydroxyphenyl) propionate (IRGANOX 1076 available from BASF A.G., and having a melting point of 50° C. to 55° C. and a molecular weight of 531), N,N'-hexane-1,6-diylbis[3-(3,5-di-tert-butyl-4-hydroxyphenyl) propionamide] (IRGANOX 1098 available from BASF A.G., and having a melting point of 156° C. to 161° C. and a molecular weight of 637), triethylene glycol-bis[3-(3-tert-butyl-5-methyl-4-hydroxyphenyl) propionate] (IRGANOX 245 available from BASF A.G., and having a melting point of 76° C. to 79° C. and a molecular weight of 587), 1,6-hexanediol-bis[3-(3,5-di-tert-butyl-4-hydroxyphenyl) propionate] (IRGANOX 259 available from BASF A.G., and having a melting point of 104° C. to 108° C. and a molecular weight of 639), 2,2'-methylene-bis(4-methyl-6-tert-butylphenol) (Sumilizer MDP-s available from Sumitomo Chemical Co., Ltd., and having a melting point of about 128° C. and a molecular weight of 341), 2-tert-butyl-6-(3-tert-butyl-2-hydroxy-5-methylbenzyl)-4-methylphenyl acrylate (Sumilizer GM available from Sumitomo Chemical Co., Ltd., and having a melting point of about 128° C. and a molecular weight of 395), and 3,9-bis[2-{3-(3-tert-butyl-4-hydroxy-5-methylphenyl)propionyloxy}-1,1-dimethylethyl]-2,4,8,10-tetraoxaspiro[5,5]undecane (Sumilizer GA-80 available from Sumitomo Chemical Co., Ltd., and having a melting point of about 110° C. and a molecular weight of 741). Particularly, pentaerythritol tetrakis[3-(3,5-di-tert-butyl-4-hydroxyphenyl) propionate] and N,N'-hexane-1,6-diylbis[3-(3,5-di-tert-butyl-4-hydroxyphenyl) propionamide] are preferred.

As described above, the hindered amine antioxidant is also preferred as the antioxidant (B). Where the hindered amine antioxidant is blended as the antioxidant (B) in the EVOH resin composition, the hindered amine antioxidant is effective not only to prevent the thermal degradation of the EVOH (A) but also to trap aldehyde occurring due to thermal decomposition of the EVOH (A). Thus, the hindered amine antioxidant can suppress generation of decomposition gas, thereby suppressing occurrence of voids or bubbles during the forming. Further, where the EVOH resin composition of the present disclosure is used as a food packaging container material, for example, the hindered amine antioxidant traps the aldehyde, making it possible to solve a problem such that the odor of the aldehyde impairs the taste of food packaged by the food packaging container material.

A piperidine derivative is preferred as the hindered amine antioxidant. Particularly, a 2,2,6,6-tetraalkylpiperidine derivative having a substituent at the 4-position is preferably used. Examples of the substituent at the 4-position include carboxyl group, alkoxyl group, and alkylamino group.

In the hindered amine antioxidant (a compound having a hindered amine group), the hindered amine group preferably has a hydrogen atom bonded to the N-position thereof for excellent heat stabilization effect, but may have an alkyl group bonded to the N-position thereof.

Specific examples of the hindered amine antioxidant include bis(2,2,6,6-tetramethyl-4-piperidyl) sebacate (TINUVIN 770 available from BASF A.G., and having a melting point of 81° C. to 85° C. and a molecular weight of 481), mixture of bis(1,2,2,6,6-pentamethyl-4-piperidyl) sebacate and 1,2,2,6,6-pentamethyl-4-piperidyl sebacate (liquid compound TINUVIN 765 available from BASF A.G., and having a molecular weight of 509), polycondensate of dimethyl succinate and 1-(2-hydroxyethyl)-4-hydroxy-2,2,6,6-tetramethylpiperidine (TINUVIN 622LD available from BASF A.G., and having a melting point of 55° C. to 70° C. and a molecular weight of 3,100 to 4,000), condensate of N,N'-bis(3-aminopropyl)ethylenediamine and 2,4-bis[N-butyl-N-(1,2,2,6,6-pentamethyl-4-piperidyl) amino]-6-chloro-1,3,5-triazine (CHIMASSORB 119FL available from BASF A.G., and having a melting point of 130° C. to 140° C. and a molecular weight of not lower than 2,000), poly[{6-(1,1,3,3-tetramethylbutyl)amino-1,3,5-triazine-2,4-diyl}{(2,2,6,6-tetramethyl-4-piperidyl) imino}hexamethylene{(2,2,6,6-tetramethyl-4-piperidyl) imino}] (CHIMASSORB 944LD available from BASF A.G., and having a melting point of 100° C. to 135° C. and a molecular weight of 2,000 to 3,100), bis(1,2,2,6,6-pentamethyl-4-piperidyl) [{3,5-bis(1,1-dimethylethyl)-4-hydroxyphenyl}methyl]butyl malonate (TINUVIN 144 available from BASF A.G., and having a melting point of 146° C. to 150° C. and a molecular weight of 685), N,N'-1,6-hexanediylbis{N-(2,2,6,6-tetramethyl-4-piperidinyl)-formamide} (UVINUL 4050H available from BASF A.G., and having a melting point of 157° C. and a molecular weight of 450), and UVINUL 5050H available from BASF A.G. (having a melting point of 104° C. to 112° C. and a molecular weight of about 3,500). Of these, bis(2,2,6,6-tetramethyl-4-piperidyl) sebacate is preferred.

The antioxidants described above may each be used alone as the antioxidant (B), but two or more of the antioxidants which are different in structure, formulation, molecular weight, and the like may be used in combination as the antioxidant (B). The antioxidant (B) may be used in any form, e.g., in powdery form, particulate form, liquid form, paste form or emulsion form.

The antioxidant (B) typically has a melting point of not higher than 200° C., preferably not higher than 170° C. The lower limit of the melting point of the antioxidant (B) is typically 30° C. If the melting point of the antioxidant (B)

is excessively high, a product formed from the EVOH resin composition is liable to have a lower quality because the antioxidant (B) does not melt in an extruder and is locally present in the formed product.

The antioxidant (B) typically has a molecular weight of 100 to 8,000, preferably 200 to 5,000, particularly preferably 300 to 2,000. If the molecular weight of the antioxidant (B) is excessively low, the antioxidant (B) is liable to bleed out on a surface of the formed product. If the molecular weight of the antioxidant (B) is excessively high, the formed product is liable to have a lower quality because the antioxidant (B) is locally present in the formed product.

The amount of the antioxidant (B) contained in the EVOH resin composition is typically 1 to 30,000 ppm, preferably 100 to 10,000 ppm, particularly preferably 1,000 to 5,000 ppm, based on the weight of the EVOH resin composition. If the amount of the antioxidant (B) is excessively small, the effect of blending the antioxidant (B) tends to be reduced. If the amount of the antioxidant (B) is excessively great, the antioxidant (B) tends to bleed out on the surface of the formed product.

Where two or more antioxidants different in structure, formulation, molecular weight, and the like are used in combination as the antioxidant (B), the total weight (total amount) of these antioxidants needs to fall within the aforementioned ranges.

The amount of the antioxidant (B) based on the weight of the EVOH resin composition may be measured in the following manner. A sample is prepared by freeze-pulverizing the EVOH resin composition, and the antioxidant (B) is extracted from 1 g of the sample into an extraction solvent, which is in turn diluted to a predetermined volume. Then, the resulting solution is analyzed by means of liquid chromatography/UV spectrophotometer. A calibration line is separately prepared by using standard solutions of the antioxidant (B), and the amount of the antioxidant (B) is determined by an absolute calibration line method.

[Sorbic Acid Ester (C)]

In the present disclosure, the antioxidant (B) and a specific very small amount of the sorbic acid ester (C) are blended in the EVOH resin composition, and the weight ratio between the antioxidant (B) and the sorbic acid ester (C) falls within a specific range, thereby providing a remarkable coloration suppressing effect.

In the present disclosure, the EVOH resin composition containing the EVOH (A) and the antioxidant (B) further contains the sorbic acid ester (C) in the specific very small amount, and the weight ratio between the antioxidant (B) and the sorbic acid ester (C) falls within the specific range. Thus, the EVOH resin composition is excellent in coloration suppressing effect.

In the present disclosure, a reason why the coloration is suppressed is supposedly that the sorbic acid ester (C) has a lower polarity and, therefore, can be homogeneously dispersed in the EVOH resin composition even if being present in the very small amount in the EVOH resin composition. It is considered that, when the EVOH resin composition is heated, the specific very small amount of the sorbic acid ester (C) is hydrolyzed to generate sorbic acid, which in turn captures radicals, whereby the excellent coloration suppressing effect is provided. Further, it is supposed that a so-called catalytic cycle occurs in which an alcohol resulting from the hydrolysis of the sorbic acid ester (C) reacts with sorbic acid capturing the radicals, whereby the sorbic acid ester (C) is generated, and then the sorbic acid ester (C) thus generated is thermally hydrolyzed again.

It is supposed that sorbic acid capable of capturing the radicals thus constantly occurs and, therefore, the radicals can be captured in the EVOH resin composition at the early stage of the radical generation, making it possible to provide the excellent coloration suppressing effect. It is also supposed that, in the present disclosure in which the EVOH resin composition contains the antioxidant (B) and the specific very small amount of the sorbic acid ester (C), and the weight ratio between the antioxidant (B) and the sorbic acid ester (C) falls within the specific range, the aforementioned cycle can efficiently work to thereby provide the remarkable coloration suppressing effect.

A sorbic acid ester prepared by condensation of sorbic acid and an alcohol or a phenol derivative, for example, is usable as the sorbic acid ester (C). Specific examples of the sorbic acid ester include alkyl sorbates such as methyl sorbate, ethyl sorbate, propyl sorbate, butyl sorbate, and pentyl sorbate, and aryl sorbates such as phenyl sorbate and naphthyl sorbate, which may be used alone or in combination.

Where the acidity of the alcohol resulting from the hydrolysis of the sorbic acid ester (C) is relatively low, the EVOH resin composition is less susceptible to the coloration. Therefore, the alkyl sorbates are preferred, and alkyl sorbates containing a C1 to C5 alkoxy group are more preferred. Alkyl sorbates containing a C1 to C3 alkoxy group are particularly preferred, and methyl sorbate and ethyl sorbate are most preferred.

The sorbic acid ester (C) typically has a molecular weight of 120 to 220, preferably 120 to 200, particularly preferably 120 to 160. Where the molecular weight of the sorbic acid ester (C) falls within the aforementioned ranges, the coloration suppressing effect tends to be efficiently provided.

The amount of the sorbic acid ester (C) contained in the EVOH resin composition is 0.00001 to 10 ppm, preferably 0.00005 to 5 ppm, more preferably 0.0001 to 4 ppm, particularly preferably 0.0005 to 3 ppm, especially preferably 0.001 to 1.5 ppm, based on the weight of the EVOH resin composition. Where the amount of the sorbic acid ester (C) falls within the aforementioned ranges, the coloration suppressing effect is efficiently provided. If the amount of the sorbic acid ester (C) is excessively great, the number of conjugated double bonds is excessively great, so that the coloration is liable to result.

In the case of pellets and other products formed from the EVOH resin composition of the present disclosure, the amount of the sorbic acid ester (C) contained in the EVOH resin composition can be measured by the following method. A sample is first prepared by pulverizing the formed product (e.g., the pellets) by a given method (e.g., a freeze-pulverizing method), and dissolving the pulverized product in a C1 to C5 lower alcohol solvent. Then, the sample is analyzed by a liquid chromatography/mass spectrometry (LC/MS/MS) method, whereby the amount of the sorbic acid ester (C) is determined.

In the case of a formed product containing the EVOH resin composition and some other thermoplastic resin or the like (e.g., a multilayer structure), a layer of the EVOH resin composition to be analyzed is taken out of the multilayer structure by a given method, and the measurement is performed in the aforementioned manner.

In the EVOH resin composition, the weight ratio (B)/(C) of the antioxidant (B) to the sorbic acid ester (C) is typically 500 to 1,000,000, preferably 1,000 to 800,000, particularly preferably 2,000 to 650,000. If the weight ratio is excessively small, the coloration suppressing effect is liable to be reduced. If the weight ratio is excessively great, the coloration suppressing effect is also liable to be reduced.

[Other Thermoplastic Resin]

The EVOH resin composition of the present disclosure may contain a thermoplastic resin other than the EVOH (A) as a resin component, typically, in an amount of not greater than 30 wt. %, preferably not greater than 10 wt. %, based on the weight of the EVOH resin composition.

Specific examples of the other thermoplastic resin include olefin homopolymers and copolymers such as linear low-density polyethylenes, low-density polyethylenes, medium-density polyethylenes, high-density polyethylenes, ethylene-vinyl acetate copolymers, ionomers, ethylene-propylene copolymers, ethylene-α-olefin (C4 to C20 α-olefin) copolymers, ethylene-acrylate copolymers, polypropylenes, propylene-α-olefin (C4 to C20 α-olefin) copolymers, polybutenes, and polypentenes, polycycloolefins, polyolefin resins in a broader sense such as modified polyolefin resins obtained by graft-modifying any of the aforementioned olefin homopolymers and copolymers with an unsaturated carboxylic acid or an unsaturated carboxylic acid ester, polystyrene resins, polyester resins, chlorinated vinyl resins such as polyvinyl chlorides and polyvinylidene chlorides, polyamide resins, acrylic resins, vinyl ester resins, polyester elastomers, styrene elastomers, polyurethane elastomers, chlorinated polyethylenes, and chlorinated polypropylenes. These may be used alone or in combination. Particularly, the polyamide resins and the styrene elastomers are preferred, because the coloration suppressing effect of the present disclosure are noticeable.

[Other Additives]

As required, the EVOH resin composition of the present disclosure may contain known additives in addition to the aforementioned components in amounts that do not impair the effects of the present disclosure (e.g., typically in amounts of not greater than 10 wt. % based on the overall weight of the EVOH resin composition). Examples of the additives include: plasticizer (e.g., aliphatic polyhydric alcohol such as ethylene glycol, glycerin, hexanediol, or the like); lubricant such as higher fatty acid (e.g., lauric acid, myristic acid, palmitic acid, stearic acid, behenic acid, oleic acid, or the like), higher fatty acid metal salt (e.g., calcium stearate, magnesium stearate, or the like), higher fatty acid ester (e.g., methyl ester, isopropyl ester, butyl ester, octyl ester, or the like of higher fatty acid), higher fatty acid amide (e.g., stearamide, oleamide, or the like), bis-higher fatty acid amide (e.g., ethylene bis-stearamide, or the like), or low-molecular weight polyolefin (e.g., low-molecular weight polyethylene or low-molecular weight polypropylene having a molecular weight of about 500 to about 10,000); drying agent; oxygen absorber; inorganic filler; heat stabilizer; photo stabilizer; flame retardant; crosslinking agent; curing agent; foaming agent; crystal nucleating agent; antifogging agent; biodegradation agent; silane coupling agent; antiblocking agent; colorant; antistatic agent; UV absorber; antibacterial agent; insoluble inorganic double salt (e.g., hydrotalcites or the like); surfactant; and wax. These may be used alone or in combination.

Examples of the heat stabilizer to be used for improving the heat stability and other various physical properties during the melt forming include: organic acids such as acetic acid, propionic acid, and butyric acid, salts of the organic acids such as alkali metal salts (sodium salts, potassium salts, and the like), alkali earth metal salts (calcium salts, magnesium salts, and the like), and zinc salts of the organic acids; and inorganic acids such as sulfuric acid, sulfurous acid, carbonic acid, phosphoric acid, and boric acid, and alkali metal salts (sodium salts, potassium salts, and the like), alkali earth metal salts (calcium salts, magnesium salts, and the like), and zinc salts of the inorganic acids.

Of these, acetic acid, boron compounds such as boric acid and its salts, acetic acid salts, and phosphoric acid salts are preferred as the heat stabilizer.

The amount of acetic acid to be blended as the heat stabilizer is typically 0.001 to 1 part by weight, preferably 0.005 to 0.2 parts by weight, particularly preferably 0.01 to 0.1 part by weight, based on 100 parts by weight of the EVOH (A). If the amount of acetic acid is excessively small, the effect of blending acetic acid tends to be reduced. If the amount of acetic acid is excessively great, on the other hand, formation of a uniform film tends to be difficult.

The amount of a boron compound to be blended as the heat stabilizer is typically 0.001 to 1 part by weight on a boron basis based on 100 parts by weight of the EVOH (A) (as measured by ICP emission spectrometry after ashing). If the amount of the boron compound is excessively small, the effect of blending the boron compound tends to be reduced. If the amount of the boron compound is excessively great, on the other hand, formation of a uniform film tends to be difficult.

The amount of an acetic acid salt or a phosphoric acid salt (or a hydrogen phosphoric acid salt) to be blended as the heat stabilizer is typically 0.0005 to 0.1 part by weight on a metal basis based on 100 parts by weight of the EVOH (A) (as measured by ICP emission spectrometry after ashing). If the amount of the acetic acid salt or the phosphoric acid salt is excessively small, the effect of the blending tends to be reduced. If the amount of the acetic acid salt or the phosphoric acid salt is excessively great, on the other hand, formation of a uniform film tends to be difficult. Where two or more salts are blended as the heat stabilizer in the EVOH resin composition, the total amount of the two or more salts preferably falls within the aforementioned range.

[EVOH Resin Composition Production Method]

The EVOH resin composition of the present disclosure is produced by using the EVOH (A), the antioxidant (B), and the sorbic acid ester (C) as the essential components and, as required, using any of the aforementioned optional additives. Known examples of a method for the production include dry blending method, melt mixing method, solution mixing method, and impregnation method, which may be used in combination.

An example of the dry blending method is a method (I) including the step of dry-blending at least one selected from the group consisting of the antioxidant (B) and the sorbic acid ester (C) with pellets containing the EVOH (A) by means of a tumbler or the like.

Examples of the melt mixing method include: a method (II) including the steps of melt-kneading a dry blend of at least one selected from the group consisting of the antioxidant (B) and the sorbic acid ester (C), and pellets containing the EVOH (A), and forming the resulting melt mixture into pellets or other product; and a method (III) including the steps of adding at least one selected from the group consisting of the antioxidant (B) and the sorbic acid ester (C) to the EVOH (A) in a melted state, melt-kneading the resulting mixture, and forming the resulting melt mixture into pellets or other product.

Examples of the solution mixing method include: a method (IV) including the steps of preparing a solution by using commercially available pellets containing the EVOH (A), blending at least one selected from the group consisting of the antioxidant (B) and the sorbic acid ester (C) with the solution, solidifying and forming the resulting solution into pellets, separating the pellets from the solution, and drying the pellets; and a method (V) including the steps of adding at least one selected from the group consisting of the antioxidant (B) and the sorbic acid ester (C) to a homogeneous solution (water/alcohol solution or the like) of the EVOH after the saponification in the preparation of the EVOH (A), solidifying and forming the resulting solution into pellets, separating the pellets from the solution, and drying the pellets.

An example of the impregnation method is a method (VI) including the steps of bringing pellets containing the EVOH (A) into contact with an aqueous solution containing at least one selected from the group consisting of the antioxidant (B) and the sorbic acid ester (C) to incorporate the at least one selected from the group consisting of the antioxidant (B) and the sorbic acid ester (C) into the pellets, and then drying the resulting pellets.

In the methods described above, a composition (master batch) containing at least one selected from the group consisting of the antioxidant (B) and the sorbic acid ester (C) at a higher concentration may be prepared by blending the at least one selected from the group consisting of the antioxidant (B) and the sorbic acid ester (C) in a predetermined proportion with the EVOH (A), and the EVOH resin composition may be produced as containing the at least one selected from the group consisting of the antioxidant (B) and the sorbic acid ester (C) at a predetermined concentration by blending the master batch with the EVOH (A).

In the present disclosure, different methods may be selected from the aforementioned methods to be used in combination. From the viewpoint of the productivity, pellets of the EVOH resin composition are preferably produced by adding the antioxidant (B) and the sorbic acid ester (C) to the homogeneous solution (water/alcohol solution or the like) of the EVOH after the saponification in the preparation of the EVOH (A), solidifying and forming the resulting solution into pellets, separating the pellets from the solution, and drying the pellets in the method (V). Further, the melt mixing method is preferred, and the method (II) is particularly preferred, because the EVOH resin composition produced by these methods is significantly improved in productivity and the effects of the present disclosure.

Where any of the aforementioned additives is blended as an optional component in the EVOH resin composition, the aforementioned production methods may be employed in substantially the same manner for blending the optional component in the EVOH resin composition.

The pellets of the EVOH resin composition to be produced by any of the aforementioned methods, and the pellets containing the EVOH (A) to be used in any of the aforementioned methods may each have any desired shape. The pellets may each have, for example, spherical shape, oval shape, cylindrical shape, cubic shape, square prism shape, or the like, and typically the oval shape or the cylindrical shape. For easy handling of the pellets in the subsequent use as a forming material, the cylindrical pellets typically each have a bottom diameter of 1 to 6 mm and a length of 1 to 6 mm, preferably a bottom diameter of 2 to 5 mm and a length of 2 to 5 mm. In the case of the oval pellets, the major diameter is typically 1.5 to 30 mm, preferably 3 to 20 mm, more preferably 3.5 to 10 mm, and the minor diameter is typically 1 to 10 mm, preferably 2 to 6 mm, particularly preferably 2.5 to 5.5 mm. In an exemplary method for determination of the major diameter and the minor diameter, a pellet is observed on a hand, and the major diameter of the pellet is measured by means of a measuring instrument such as a caliper. Then, a maximum sectional plane orthogonal to the major diameter is visually and tactually identified, and the minor diameter of the maximum sectional plane is measured in the aforementioned manner.

The EVOH resin composition of the present disclosure typically has a water content of 0.01 to 0.5 wt. %, preferably 0.05 to 0.35 wt. %, particularly preferably 0.1 to 0.3 wt. %.

In the present disclosure, the water content of the EVOH resin composition is measured and calculated by the following method.

The weight (W1) of a sample of the EVOH resin composition is measured at a room temperature (25° C.) by an electronic balance before drying, and the sample is dried at 150° C. for 5 hours in a hot air dryer. After the drying, the sample is cooled in a desiccator for 30 minutes. After the temperature of the sample of the EVOH resin composition is returned to the room temperature, the weight (W2) of the sample is measured. The water content of the EVOH resin composition is calculated from the following expression:

Water content (wt. %)=[($W1-W2$)/$W1$]×100

The EVOH resin composition of the present disclosure may be produced in any of various forms, e.g., in pellet form, powdery form, or liquid form, for use as a forming material for various formed products. Particularly, the EVOH resin composition of the present disclosure is preferably provided as a melt forming material, because the effects of the present disclosure tend to be more efficiently provided. The EVOH resin composition of the present disclosure may be a resin composition prepared by mixing the EVOH resin composition with a resin other than the EVOH (A).

The pellets of the EVOH resin composition of the present disclosure may be used as they are for the melt forming. In order to ensure stable feeding of the EVOH resin composition pellets in the melt forming, it is also preferred to apply a known lubricant to surfaces of the pellets. Any of the lubricants described above may be used. The amount of the lubricant present on the pellets is typically not greater than 5 wt. %, preferably not greater than 1 wt. %, based on the weight of the EVOH resin composition.

Exemplary products to be formed from the EVOH resin composition of the present disclosure for practical applications include a single-layer film formed by using the EVOH resin composition of the present disclosure, and a multilayer structure including a layer formed by using the EVOH resin composition of the present disclosure.

[Multilayer Structure]

A multilayer structure of the present disclosure includes a layer formed from the EVOH resin composition of the present disclosure. The layer formed from the EVOH resin composition of the present disclosure (hereinafter referred to as "EVOH resin composition layer") may be laminated with some other base material (hereinafter referred to as "base resin") containing a thermoplastic resin other than the EVOH resin composition of the present disclosure as a major component. Thus, the EVOH resin composition layer can be strengthened, protected from moisture and other influence, and/or imparted with an additional function.

Examples of the base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers, and ethylene-α-olefin (C4 to C20 α-olefin) copolymers, polypropylene resins such as polypropylenes and propylene-α-olefin (C4 to C20 α-olefin) copolymers, polybutenes, polypentenes, and polycycloolefin resins (polymers having a cycloolefin structure in a main chain and/or a side chain thereof); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylic acid ester; and ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acrylic resins, polystyrene resins, vinyl ester resins, polyester elastomers, polyurethane elastomers, polystyrene elastomers, halogenated polyolefins such as chlorinated polyethylenes and chlorinated polypropylenes, and aromatic and aliphatic polyketones. These may be used alone or in combination.

Of these, the polyamide resins, the polyolefin resins, the polyester resins, and the polystyrene resins, which are hydrophobic resins, are preferred, and the polyolefin resins such as the polyethylene resins, the polypropylene resins, the polycycloolefin resins, and the unsaturated carboxyl-modified polyolefin resins obtained by modifying these polyolefin resins are more preferred. Particularly, the polycycloolefin resins are preferred as hydrophobic resins.

Where layers a (a1, a2, . . . ) formed from the EVOH resin composition of the present disclosure and base resin layers b (b1, b2, . . . ) are laminated together to produce a multilayer structure, the layered configuration of the multilayer structure may be any combination of these layers, e.g., a/b, b/a/b, a/b/a, a1/a2/b, a/b1/b2, b2/b1/a/b1/b2, b2/b1/a/b1/a/b1/b2, or the like. Where the multilayer structure further includes a recycle layer R formed from a mixture obtained by re-melting cutoff pieces and defective products occurring during the production of the multilayer structure and containing the EVOH resin composition of the present disclosure and the base resin, possible combinations of the layers for the layered configuration include b/R/a, b/R/a/b, b/R/a/R/b, b/a/R/a/b, b/R/a/R/a/R/b, and the like. The total number of the layers of the multilayer structure is typically 2 to 15, preferably 3 to 10. In the aforementioned layered configuration, as required, an adhesive resin layer containing an adhesive resin may be provided between the layers.

Known adhesive resins are usable as the adhesive resin. The adhesive resin may be properly selected according to the type of the thermoplastic resin to be used for the base resin layers b. Typical examples of the adhesive resin include carboxyl-containing modified polyolefin polymers prepared by chemically bonding an unsaturated carboxylic acid or its anhydride to a polyolefin resin by an addition reaction, a graft reaction or the like. Examples of the carboxyl-containing modified polyolefin polymers include polyethylenes graft-modified with maleic anhydride, polypropylenes graft-modified with maleic anhydride, ethylene-propylene (block and random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride, and polyolefin resins graft-modified with maleic anhydride. These adhesive resins may be each used alone, or two or more of these adhesive resins may be used as a mixture.

Where the adhesive resin layer is provided between the EVOH resin composition layer and the base resin layer in the multilayer structure, the adhesive resin layer is located in contact with the EVOH resin composition layer and, therefore, a highly hydrophobic adhesive resin is preferably used for the adhesive resin layer.

The base resin and the adhesive resin may each contain conventionally known plasticizer, filler, clay (montmorillonite or the like), colorant, antioxidant, antistatic agent, lubricant, nucleating agent, antiblocking agent, wax, and the like in amounts that do not impair the effects of the present disclosure (e.g., typically in amounts of not greater than 30 wt. %, preferably not greater than 10 wt. %, based on the weight of the base resin or the adhesive resin). These may be used alone or in combination.

The EVOH resin composition layer formed from the EVOH resin composition of the present disclosure and the base resin layer may be laminated together (optionally with the adhesive resin layer provided therebetween) by a known laminating method. Examples of the laminating method include: a method in which a film or a sheet of the EVOH resin composition of the present disclosure is laminated with the base resin by melt extrusion; a method in which the base resin layer is laminated with the EVOH resin composition of the present disclosure by melt extrusion; a method in which the EVOH resin composition and the base resin are coextruded; a method in which the EVOH resin composition layer and the base resin layer are dry-laminated together with the use of a known adhesive agent such as of organic titanium compound, isocyanate compound, polyester compound or polyurethane compound; and a method in which a solution of the EVOH resin composition is applied on the base resin layer, and a solvent is removed from the applied solution. Of these methods, the coextrusion method is preferred from the viewpoint of costs and environmental concerns.

The multilayer structure described above is further subjected to a (heat) stretching process as required. The stretching process may be a uniaxial stretching process or a biaxial stretching process. The biaxial stretching process may be a simultaneous stretching process or a sequential stretching process. Exemplary methods for the stretching process include roll stretching method, tenter stretching method, tubular stretching method, stretch blowing method, and vacuum pressure forming method each having a higher stretch ratio. A temperature for the stretching is close to the melting point of the multilayer structure, and is typically selected from a range of about 40° C. to about 170° C., preferably about 60° C. to about 160° C. If the stretching temperature is excessively low, the stretchability tends to be poorer. If the stretching temperature is excessively high, it tends to be difficult to ensure stable stretching.

The resulting multilayer structure may be further subjected to a heat setting process to ensure dimensional stability after the stretching. The heat setting process may be performed in a well-known manner. For example, the stretched film is typically heat-treated at 80° C. to 180° C., preferably 100° C. to 165° C., for about 2 to about 600 seconds, while being kept tense. Where the stretched multilayer film produced by using the EVOH resin composition of the present disclosure is used as a shrinkable film, the stretched film may be cold-set so as to be imparted with a heat-shrinkable property, for example, by applying cold air over the stretched film without performing the above heat setting process.

Further, a cup-shaped or tray-shaped multilayer container may be produced by using the multilayer structure of the present disclosure. In this case, a drawing process is typically employed. Specific examples of the drawing process include vacuum forming method, pressure forming method, vacuum pressure forming method, and plug-assisted vacuum pressure forming method. Where a tube-shaped or bottle-shaped multilayer container (laminate structure) is produced from a multilayer parison (a hollow tubular preform to be blown), a blow molding process is employed. Specific examples of the blow molding process include extrusion blow molding method (twin head type, mold shift type, parison shift type, rotary type, accumulator type, horizontal parison type, and the like), cold parison blow molding method, injection blow molding method, and biaxial stretching blow molding method (extrusion type cold parison biaxial stretching blow molding method, injection type cold parison biaxial stretching blow molding method, injection inline type biaxial stretching blow molding method, and the like). As required, the resulting multilayer structure may be subjected to heating process, cooling process, rolling process, printing process, dry laminating process, solution or melt coating process, bag forming process, deep drawing process, box forming process, tube forming process, splitting process, or the like.

The thickness of the multilayer structure (or the stretched multilayer structure) and the thicknesses of the EVOH resin composition layer, the base resin layer, and the adhesive resin layer of the multilayer structure vary depending upon the layered configuration, the type of the base resin, the type of the adhesive resin, and the use purpose, the package shape, the required physical properties, and the like of the multilayer structure. The thickness of the multilayer structure (or the stretched multilayer structure) is typically 10 to 5,000 μm, preferably 30 to 3,000 μm, particularly preferably 50 to 2,000 μm. The thickness of the EVOH resin composition layer is typically 1 to 500 μm, preferably 3 to 300 μm, particularly preferably 5 to 200 μm. The thickness of the base resin layer is typically 5 to 3,000 μm, preferably 10 to 2,000 μm, particularly preferably 20 to 1,000 μm. The thickness of the adhesive resin layer is typically 0.5 to 250 μm, preferably 1 to 150 μm, particularly preferably 3 to 100 μm.

The thickness ratio between the EVOH resin composition layer and the base resin layer of the multilayer structure (resin composition layer/base resin layer) (if these layers each include a plurality of layers, the thickness ratio between the thickest one of the EVOH resin composition layers and the thickest one of the base resin layers) is typically 1/99 to 50/50, preferably 5/95 to 45/55, particularly preferably 10/90 to 40/60. The thickness ratio between the EVOH resin composition layer and the adhesive resin layer of the multilayer structure (resin composition layer/adhesive resin layer) (if these layers each include a plurality of layers, the thickness ratio between the thickest one of the EVOH resin composition layers and the thickest one of the adhesive resin layers) is typically 10/90 to 99/1, preferably 20/80 to 95/5, particularly preferably 50/50 to 90/10.

Bags, cups, trays, tubes, bottles, and other containers, and caps produced from the film, the sheet or the stretched film formed in the aforementioned manner are useful as packaging material containers for general foods, condiments such as mayonnaise and dressing, fermented foods such as miso, fat and oil such as salad oil, beverages, cosmetics, and pharmaceutical products. The layer formed from the EVOH resin composition of the present disclosure is excellent in degradation resistance and, therefore, is particularly useful for an agricultural film such as silage film and multi-purpose film.

[Multilayer Pipe]

A multilayer pipe of the present disclosure is a pipe of a multilayer structure including a layer formed from the EVOH resin composition of the present disclosure. The layer formed from the EVOH resin composition of the present disclosure is laminated with a layer of some other resin composition containing a resin other than the EVOH resin composition of the present disclosure as a major component. Thus, the EVOH resin composition layer can be strengthened, protected from moisture and other influence, and/or imparted with an additional function.

The multilayer pipe of the present disclosure is excellent in gas barrier property, because the multilayer pipe includes the layer formed from the EVOH resin composition containing the EVOH (A) as the major component. The layer formed from the EVOH resin composition is excellent in degradation resistance even if being exposed to a higher temperature for a prolonged period. Therefore, the layer formed from the EVOH resin composition (EVOH resin composition layer) is less susceptible to cracking due to oxidative degradation even during prolonged use at a higher temperature. With such a property, the multilayer pipe of the present disclosure can be advantageously used, for example, as a hot water circulation pipe and as a heat insulative multilayer pipe for district air conditioning.

The layered configuration described above for the multilayer structure may be employed for the multilayer pipe of the present disclosure. Where the multilayer pipe is used as the hot water circulation pipe, for example, the multilayer pipe generally has a layered configuration of three-layer structure including an outermost layer formed from the EVOH resin composition of the present disclosure, an intermediate layer formed by using an adhesive resin, and an innermost layer formed by using a thermoplastic resin (EVOH resin composition layer/adhesive resin layer/thermoplastic resin layer). Examples of the thermoplastic resin include polyolefins such as polyethylenes, polypropylenes, poly-1-butenes, poly-4-methyl-1-pentenes. Of these, the polyethylenes are preferred, and high-density polyethylenes are particularly preferred. The adhesive resins described above for the multilayer structure are usable as the adhesive resin for the multilayer pipe. Examples of the adhesive resin include carboxyl-containing modified polyolefin polymers prepared by chemically bonding an unsaturated carboxylic acid or its anhydride to a polyolefin resin by an addition reaction, a graft reaction or the like.

Where the multilayer pipe of the present disclosure is used as the hot water circulation pipe such as floor heating pipe, the layer formed from the EVOH resin composition of the present disclosure is preferably provided as the outermost layer, as described above, from the viewpoint of the gas barrier property. That is, the layer formed from the EVOH resin composition of the present disclosure excellent in gas barrier property as well as degradation resistance is provided as the outermost layer in the multilayer pipe of the present disclosure, whereby the multilayer pipe is imparted with an advantageous multilayer pipe barrier property. Since the EVOH resin composition of the present disclosure excellent in degradation resistance is used as a forming material for the outermost layer that is brought into direct contact with air, the multilayer pipe is excellent in barrier property, and is less susceptible to cracking due to the oxidative degradation.

Next, a method of producing the multilayer pipe will be described.

The multilayer pipe of the present disclosure may be produced, for example, by preparing a single-layer pipe formed from the thermoplastic resin (e.g., a crosslinked polyolefin or the like), and coextrusion-coating an outer peripheral surface of the single-layer pipe with the EVOH resin composition of the present disclosure and the adhesive resin. For the coextrusion coating of the outer peripheral surface of the single-layer pipe with the EVOH resin composition of the present disclosure and the adhesive resin, the outer peripheral surface of the single-layer pipe may be simply coated with a melted film of the EVOH resin composition of the present disclosure and the adhesive resin. In this case, however, the adhesion between the single-layer pipe and the coat layer is often insufficient, so that the multilayer pipe is liable to lose its gas barrier property with the coat layer delaminated during prolonged use. For this reason, it is preferred to preliminarily surface-treat the outer peripheral surface of the single-layer pipe by at least one selected from the group consisting of a flame treatment and a corona-charging treatment before the coextrusion coating.

Another exemplary multilayer forming method for the production of the multilayer pipe of the present disclosure is a so-called coextrusion method in which a number of extruders corresponding to the number of the types of layer forming materials (the number of layers) are used, and the layer forming materials are melted in the respective extruders and simultaneously extruded in the form of lamellar flow. A dry laminating method and other multilayer forming methods are also usable.

The method of producing the multilayer pipe of the present disclosure preferably further includes the step of cooling the multilayer pipe with water at 10° C. to 70° C. immediately after the forming. That is, it is preferred to solidify the layer formed from the EVOH resin composition of the present disclosure by cooling the EVOH resin composition layer with water at 10° C. to 70° C. before the EVOH resin composition layer is naturally solidified after the melt forming. The temperature of the cooling water is more preferably 15° C. to 60° C., particularly preferably 20° C. to 50° C. If the temperature of the cooling water is excessively low, the layer formed from the EVOH resin composition of the present disclosure is liable to be cracked at a bent portion thereof due to stress when the multilayer pipe is bent in the subsequent secondary process. If the temperature of the cooling water is excessively high, the layer formed from the EVOH resin composition of the present disclosure is also liable to be cracked at the bent portion thereof due to stress in the secondary process.

The multilayer pipe produced by any of the aforementioned methods may be subjected to the secondary process, whereby various formed products can be produced. The secondary process is not particularly limited, but a known secondary process may be used. An exemplary secondary process is such that the multilayer pipe is heated to 80° C. to 160° C., and then formed into a desired shape and, in this state, the multilayer pipe is set for 1 minute to 2 hours.

The multilayer pipe of the present disclosure produced in the aforementioned manner is excellent in degradation resistance, because the multilayer pipe includes the layer formed from the EVOH resin composition of the present disclosure. Therefore, the multilayer pipe of the present disclosure is particularly useful as the hot water circulation pipe or the like.

EXAMPLES

The embodiments of the present disclosure will hereinafter be described more specifically by way of examples thereof. However, it should be understood that the present disclosure be not limited to the examples within the scope of the present disclosure.

In the following examples, "parts" and "%" are based on weight, unless otherwise specified.

Prior to implementation of Examples, pellets of the following EVOH (A) were prepared.

EVOH (A): Ethylene-vinyl alcohol copolymer having an ethylene structural unit content of 29 mol %, a saponification degree of 100 mol %, and an MFR of 3.2 g/10 minutes (as measured at 210° C. with a load of 2160 g)

Example 1

First, 100 parts of the pellets of the EVOH (A), 0.3 parts of pentaerythritol-tetrakis(3-(3,5-di-tert-butyl-4-hydroxyphenyl) propionate) (IRGANOX 1010 available from BASF A.G., and having a molecular weight of 1178) as the antioxidant (B), and 0.0000005 parts (corresponding to 0.005 ppm based on the weight of the EVOH resin composition) of methyl sorbate (available from FUJIFILM Wako Pure Chemical Corporation, and having a molecular weight of 126) as the sorbic acid ester (C) were pre-heated at 230° C. for 5 minutes by a plastograph (available from Brabender Corporation), and then melt-kneaded at 230° C. for 5 minutes by operating the plastograph at 50 rpm. Then, the resulting melt mixture was cooled and solidified, whereby an EVOH resin composition was prepared in an aggregated form. The EVOH resin composition thus prepared was pulverized by operating a crusher (SKR16-240 available from Sometani Sangyo Co., Ltd.) with its rotary blade rotated at a rotation speed of 650 rpm. The pulverized product of the EVOH resin composition was in a granular form having a size of 1- to 5-mm square. The resin composition had a water content of 0.16%.

Example 2

An EVOH resin composition and a pulverized product of the EVOH resin composition of Example 2 were produced in substantially the same manner as in Example 1, except that the amount of methyl sorbate was 0.0001 part (corresponding to 1 ppm based on the weight of the EVOH resin composition) The resin composition had a water content of 0.24%.

Example 3

An EVOH resin composition and a pulverized product of the EVOH resin composition of Example 3 were produced in substantially the same manner as in Example 1, except that ethyl sorbate (available from FUJIFILM Wako Pure Chemical Corporation, and having a molecular weight of 140) was used instead of methyl sorbate. The resin composition had a water content of 0.21%.

Example 4

An EVOH resin composition and a pulverized product of the EVOH resin composition of Example 4 were produced in substantially the same manner as in Example 1, except that the amount of the antioxidant (B) was 0.03 parts (corresponding to 300 ppm based on the weight of the EVOH resin composition). The resin composition had a water content of 0.18%.

Example 5

An EVOH resin composition and a pulverized product of the EVOH resin composition of Example 5 were produced in substantially the same manner as in Example 1, except that the amount of the antioxidant (B) was 0.003 parts (corresponding to 30 ppm based on the weight of the EVOH resin composition). The resin composition had a water content of 0.20%.

Example 6

An EVOH resin composition and a pulverized product of the EVOH resin composition of Example 6 were produced in substantially the same manner as in Example 4, except that the antioxidant (B) was changed to N,N'-hexane-1,6-diylbis[3-(3,5-di-tert-butyl-4-hydroxyphenyl) propionamide](IRGANOX 1098 available from BASF A.G., and having a molecular weight of 637). The resin composition had a water content of 0.16%.

Example 7

An EVOH resin composition and a pulverized product of the EVOH resin composition of Example 7 were produced in substantially the same manner as in Example 1, except that the antioxidant (B) was changed to bis(2,2,6,6-tetramethyl-4-piperidyl) sebacate (TINUVIN 770 available from BASF A.G., and having a molecular weight of 481). The resin composition had a water content of 0.20%.

Example 8

An EVOH resin composition and a pulverized product of the EVOH resin composition of Example 8 were produced in substantially the same manner as in Example 7, except that the amount of the antioxidant (B) was 0.03 parts (corresponding to 300 ppm based on the weight of the EVOH resin composition). The resin composition had a water content of 0.17%.

Comparative Example 1

An EVOH resin composition and a pulverized product of the EVOH resin composition of Comparative Example 1 were produced in substantially the same manner as in Example 1, except that methyl sorbate was not blended. The resin composition had a water content of 0.20%.

Comparative Example 2

An EVOH resin composition and a pulverized product of the EVOH resin composition of Comparative Example 2 were produced in substantially the same manner as in Example 1, except that the amount of methyl sorbate was 0.0015 parts (corresponding to 15 ppm based on the weight of the EVOH resin composition). The resin composition had a water content of 0.14%.

Comparative Example 3

A pulverized product of Comparative Example 3 was produced in substantially the same manner as in Example 1, except that neither the antioxidant (B) nor the sorbic acid ester (C) was blended and only the EVOH (A) was melt-kneaded and pulverized. The EVOH (A) had a water content of 0.11%.

Coloration Evaluations 1 and 2 were performed on the EVOH resin compositions of Examples 1 to 8 and Comparative Examples 1 to 3 by the following methods. The results are shown below in Table 1.

[Coloration Evaluation 1]

The pulverized products produced in the aforementioned manner were each used as a sample, and evaluated based on the area ratio ("3530"/"4077") of a colored area having Color No. 3530 (R216, G200, B168) to a colored area having Color No. 4077 (R248, G232, B216) measured by means of a visual analyzer IRIS VA400 (available from Alpha mos K.K.) Color No. 3530 means a deep yellowish color, while Color No. 4077 means a light yellowish color. Where the area ratio was higher, this means that the sample was yellowed.

[Coloration Evaluation 2]

The pulverized products produced in the aforementioned manner were each used as a sample, and evaluated based on the area ratio ("3530+3531"/"4077+4078") of the total area of colored areas having Color Nos. 3530 (R216, G200, B168) and 3531 (R216, G200, B184) to the total area of colored areas having Color Nos. 4077 (R248, G232, B216) and 4078 (R248, G232, B232) measured by means of a visual analyzer IRIS VA400 (available from Alpha mos K.K.) Color Nos. 3530 and 3531 mean deep yellowish colors, while Color Nos. 4077 and 4078 mean light yellowish colors. Where the deep yellowish color area ratio was higher, this means that the sample was yellowed.

TABLE 1

|  | Example 1 | Example 2 | Example 3 | Example 4 | Example 5 | Example 6 |
|---|---|---|---|---|---|---|
| Antioxidant (B) | | | | | | |
| Type | IRGANOX 1010 | IRGANOX 1010 | IRGANOX 1010 | IRGANOX 1010 | IRGANOX 1010 | IRGANOX 1098 |
| Amount (ppm) | 3,000 | 3,000 | 3,000 | 300 | 30 | 300 |
| Sorbic acid ester (C) | | | | | | |
| Type | Methyl sorbate | Methyl sorbate | Ethyl sorbate | Methyl sorbate | Methyl sorbate | Methyl sorbate |
| Amount (ppm) | 0.005 | 1 | 0.005 | 0.005 | 0.005 | 0.005 |
| Weight ratio (B)/(C) | 600,000 | 3,000 | 600,000 | 60,000 | 6,000 | 60,000 |
| Coloration Evaluation 1 | 0.4 | 0.1 | — | — | — | — |
| Coloration Evaluation 2 | 1.0 | 0.5 | 0.4 | 0.3 | 0.4 | 0.2 |

|  | Example 7 | Example 8 | Comparative Example 1 | Comparative Example 2 | Comparative Example 3 |
|---|---|---|---|---|---|
| Antioxidant (B) | | | | | |
| Type | TINUVIN 770 | TINUVIN 770 | IRGANOX 1010 | IRGANOX 1010 | — |
| Amount (ppm) | 3,000 | 300 | 3,000 | 3,000 | — |

TABLE 1-continued

| | Sorbic acid ester (C) | | | | |
|---|---|---|---|---|---|
| Type | Methyl sorbate | Methyl sorbate | — | Methyl sorbate | — |
| Amount (ppm) | 0.005 | 0.005 | — | 15 | — |
| Weight ratio (B)/(C) | 600,000 | 60,000 | — | 200 | — |
| Coloration Evaluation 1 | — | — | 0.7 | 0.8 | 0.7 |
| Coloration Evaluation 2 | 0.3 | 0.5 | 1.7 | 1.4 | 1.2 |

As shown above in Table 1, the EVOH resin composition of Comparative Example 1 in which the antioxidant (B) was contained but the sorbic acid ester (C) was not contained, the EVOH resin composition of Comparative Example 2 in which the antioxidant (B) and the sorbic acid ester (C) were contained and the amount of the sorbic acid ester (C) was greater, and the EVOH resin composition of Comparative Example 3 in which neither the antioxidant (B) nor the sorbic acid ester (C) were contained had substantially the same coloration degree.

In contrast, the EVOH resin compositions of Examples 1 to 8 in which the antioxidant (B) and the specific very small amount of the sorbic acid ester (C) were contained and the weight ratio between the antioxidant (B) and the sorbic acid ester (C) fell within the specific range were more excellent in coloration suppressing effect than the EVOH resin compositions of Comparative Examples 1 to 3.

Multilayer structures produced by using the EVOH resin compositions of Examples produced in the aforementioned manner, and multilayer pipes formed from the multilayer structures are resistant to degradation, and are less susceptible to coloration.

While specific forms of the embodiments of the present disclosure have been shown in the aforementioned examples, the examples are merely illustrative but not limitative. It is contemplated that various modifications apparent to those skilled in the art could be made within the scope of the disclosure.

The EVOH resin composition of the present disclosure is resistant to degradation, and is excellent in coloration suppressing effect. Therefore, the EVOH resin composition of the present disclosure is useful as a packaging material for various foods, condiments such as mayonnaise and dressing, fermented foods such as miso, fat and oil such as salad oil, beverages, cosmetics, and pharmaceutical products. The multilayer structure including the layer formed from the EVOH resin composition of the present disclosure is resistant to degradation, and is excellent in coloration suppressing effect. Therefore, the multilayer structure of the present disclosure is particularly useful for an agricultural film such as silage film and multi-purpose film. Further, the multilayer structure is particularly useful for a multilayer pipe for hot water circulation.

The invention claimed is:

1. An ethylene-vinyl alcohol copolymer composition comprising:
   (A) an ethylene-vinyl alcohol copolymer;
   (B) an antioxidant; and
   (C) a sorbic acid ester;
   wherein the sorbic acid ester (C) is at least one selected from the group consisting of methyl sorbate and ethyl sorbate;
   wherein the sorbic acid ester (C) is present in an amount of 0.00001 to 10 ppm based on a weight of the ethylene-vinyl alcohol copolymer composition; and
   wherein a weight ratio (B)/(C) of the antioxidant (B) to the sorbic acid ester (C) is 500 to 1,000,000.

2. The ethylene-vinyl alcohol copolymer composition according to claim 1, wherein the antioxidant (B) is present in an amount of 1 to 30,000 ppm based on the weight of the ethylene-vinyl alcohol copolymer composition.

3. A melt-forming material comprising the ethylene-vinyl alcohol copolymer composition according to claim 1.

4. A multilayer structure comprising a layer which comprises the ethylene-vinyl alcohol copolymer composition according to claim 1.

5. A multilayer pipe comprising the multilayer structure according to claim 4.

* * * * *